(12) United States Patent
Tyagi et al.

(10) Patent No.: US 10,764,279 B2
(45) Date of Patent: Sep. 1, 2020

(54) METHOD AND AN INFORMATION APPLIANCE DEVICE FOR PREVENTING SECURITY BREACH IN INFORMATION APPLIANCE DEVICE

(71) Applicant: CENTRE FOR DEVELOPMENT OF TELEMATICS (C-DOT), Bangalore, Karnataka (IN)

(72) Inventors: Vipin Tyagi, New Delhi (IN); Sridharan B, Karnataka (IN); Pallab Dutta, Karnataka (IN); Priyanka Jain, Karnataka (IN); Maheshkumar Yadavrao Gadge, Karnataka (IN); Giri Babu E, Karnataka (IN); Upendra Kumar Garapati, Karnataka (IN)

(73) Assignee: CENTRE FOR DEVELOPMENT OF TELEMATICS (C-DOT), Bangalore (IN)

( * ) Notice: Subject to any disclaimer, the term of this patent is extended or adjusted under 35 U.S.C. 154(b) by 199 days.

(21) Appl. No.: 15/685,928

(22) Filed: Aug. 24, 2017

(65) Prior Publication Data
US 2018/0063127 A1 Mar. 1, 2018

(30) Foreign Application Priority Data
Aug. 26, 2016 (IN) .............................. 201641029069

(51) Int. Cl.
*H04L 29/06* (2006.01)
*G06F 21/33* (2013.01)
(Continued)

(52) U.S. Cl.
CPC ........ *H04L 63/0838* (2013.01); *G06F 21/335* (2013.01); *G06F 21/34* (2013.01);
(Continued)

(58) Field of Classification Search
CPC ............... H04L 63/0838; H04L 63/062; H04L 63/0853; H04L 63/102; H04L 63/108;
(Continued)

(56) References Cited

U.S. PATENT DOCUMENTS

| 10,200,858 B2* | 2/2019 | Lalgudi Natarajan ....................... H04W 12/06 |
| 2005/0039025 A1* | 2/2005 | Main ................... H04N 21/235 713/182 |

(Continued)

*Primary Examiner* — Kristine L Kincaid
*Assistant Examiner* — Alexander R Lapian

(57) ABSTRACT

Embodiments herein relate to a method and an information appliance device having a unique access card for preventing security breach in the information appliance device. A multimedia content server transmits a one-time access key to both the information appliance device and a user of the information appliance device. The user must input the access key to the information appliance device. The information appliance device verifies the access key and provides access to the user for the multimedia services, by activating a periodic activation key upon successful verification of the access key. Therefore, even if unauthorized user tries to skip the access key verification process through modification of access cards used in information appliance device, the unauthorized user cannot access the multimedia service due to lack of the periodic activation key required for activating multimedia service. Hence, security breach such as, cloning or duplication of the access cards will be minimized.

10 Claims, 6 Drawing Sheets

(51) Int. Cl.
*G06F 21/34* (2013.01)
*G06F 21/50* (2013.01)

(52) U.S. Cl.
CPC ............ *G06F 21/50* (2013.01); *H04L 63/062* (2013.01); *H04L 63/0853* (2013.01); *H04L 63/102* (2013.01); *G06F 2221/2139* (2013.01); *H04L 63/108* (2013.01); *H04L 2463/101* (2013.01)

(58) Field of Classification Search
CPC . H04L 63/067; H04L 63/068; H04L 63/0846; H04L 2463/101; G06F 21/335; G06F 21/34; G06F 21/50; G06F 2221/2139
See application file for complete search history.

(56) References Cited

U.S. PATENT DOCUMENTS

| | | | | |
|---|---|---|---|---|
| 2005/0198673 | A1* | 9/2005 | Kit | H04N 21/4181 |
| | | | | 725/68 |
| 2011/0252440 | A1* | 10/2011 | Sridhara | H04N 7/163 |
| | | | | 725/31 |
| 2014/0237236 | A1* | 8/2014 | Kalinichenko | G06F 21/43 |
| | | | | 713/168 |
| 2014/0317707 | A1* | 10/2014 | Kim | H04W 12/04 |
| | | | | 726/6 |

* cited by examiner

METHOD AND AN INFORMATION APPLIANCE DEVICE FOR PREVENTING SECURITY BREACH IN INFORMATION APPLIANCE DEVICE

TECHNICAL FIELD

The present subject matter is related, in general to multimedia broadcast technologies and more particularly, but not exclusively to a method and system for preventing security breach in an information appliance device.

BACKGROUND

Presently, tremendous growth of satellite broadcasting industry has provided its consumers a wide range of multimedia contents for their viewing. With the current offerings of some satellite broadcasters and service providers, it is not uncommon for a household to have access to more than 200 multimedia channels. With such an entertainment bonanza at stake, it is no surprise that people try to access the multimedia contents and satellite signals in an unauthorized manner.

Generally, the signals from the service provider are transmitted or broadcasted to all consumers in an encrypted format or a scrambled format, and only those consumers who have the proper facilities and access codes can decrypt or descramble the received signals. Further, these access codes are currently stored in access cards or smartcards that must be inserted into an information appliance device, such as Set-Top Box (STB), used by the consumers. Even though the present day smart cards are secure enough, they are still vulnerable to security breaches such as, cloning and/or duplications under extreme adverse conditions. Further, a cloned card, used on any STB, can give an end user a complete access to all the multimedia services provided by the service provider.

Therefore, it is necessary to identify possibility of security breach in the information appliance device, and to add additional levels of security checks for the use of smartcards in the STB.

SUMMARY

Disclosed herein is a method for preventing security breach in an information appliance device comprising a unique access card configured with operator specific information. The method comprises receiving a control message, comprising a first one-time access key and a periodic activation key, in response to a content access request made by a user for accessing multimedia service from a multimedia content server, from the multimedia content server upon validating the content access request by the multimedia content server. The control message corresponds to the information appliance device. Upon receiving the control message, the method comprises receiving a second one-time access key from the user via an input unit associated with the information appliance device. The second one-time access key is provided to the user through an end user device associated with the user, by the multimedia content server upon validating the content access request. Further, the method comprises verifying the second one-time access key with the first one-time access key for storing the periodic activation key in a storage unit associated with the access card. Finally, the method comprises activating the periodic activation key for providing access to the user for the multimedia service based on the periodic activation key.

Further, the present disclosure relates to an information appliance device, comprising a unique access card configured with operator specific information, for preventing security breach in the information appliance device. The information appliance device comprises a processor and a memory. The memory is communicatively interfaced with the processor and stores processor-executable instructions, which on execution cause the processor to receive a control message, comprising a first one-time access key and a periodic activation key, in response to a content access request made by a user for accessing multimedia service from a multimedia content server, from the multimedia content server upon validating the content access request by the multimedia content server. The control message corresponds to the information appliance device. Upon receiving the control message, the instructions further cause the processor to receive a second one-time access key from the user via an input unit associated with the information appliance device. The second one-time access key is provided to the user, through an end user device associated with the user, by the multimedia content server upon validating the content access request. Further, the instructions cause the processor to verify the second one-time access key with the first one-time access key to store the periodic activation key in a storage unit associated with the access card upon. Finally, the instructions cause the processor to activate the periodic activation key to provide access to the user for the multimedia service based on the periodic activation key.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
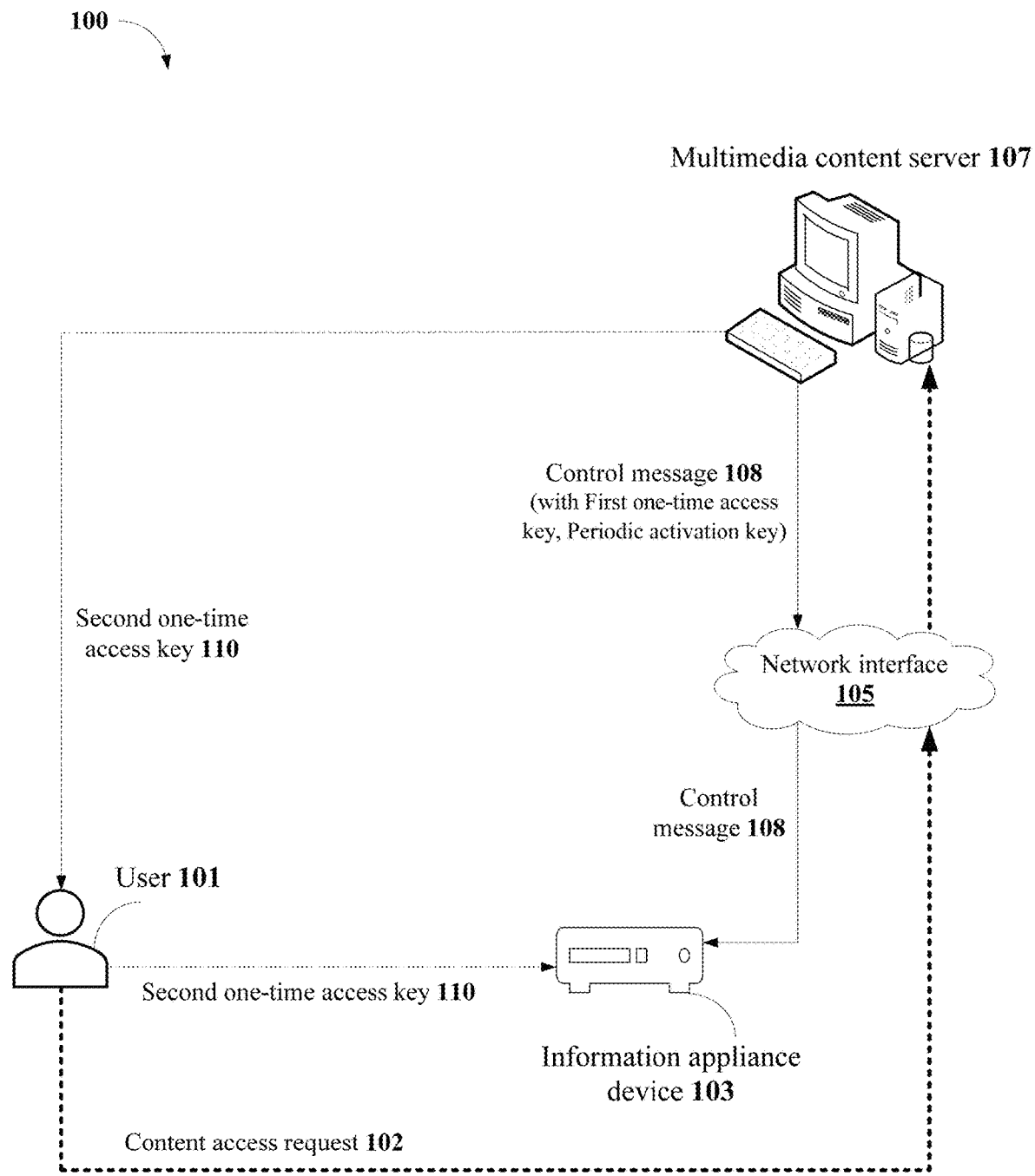
FIG. 1 illustrates an exemplary environment for preventing security breach in an information appliance device in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an information appliance device for preventing security breach in the information appliance device, which is used by a user to access various multimedia services provided by a multimedia service provider. The multimedia service providers usually broadcast the requested multimedia services using a traditional one-way communication links, without a reverse communication channel. Due to this reason, the paid multimedia industry is susceptible to several types of security attacks.

Despite implementing stronger and newer security algorithms for ensuring conditional access to the multimedia services, the adversaries can take advantage of newer technologies for breach, since the information appliance devices such as, Set-Top Boxes (STBs) are not replaced or updated in any way as frequently as newer hacking technologies are emerging.

The proposed method and the information appliance device aim at preventing the effect of cloning or duplication attacks, especially cloning of access cards or smartcards that must be inserted into the information appliance device for availing multimedia services broadcasted by the multimedia service providers. This is achieved by realizing a reverse communication channel via user's registered mobile number. Since operators and/or multimedia service providers register and store the subscriber information/credentials during subscription registration, the registered mobile number of the subscriber can be used for enforcing authorized usage of the subscribed multimedia services.

In an embodiment, even a valid user, having a valid subscription to the multimedia services, may try to misappropriate his subscription by letting multiple users use his/her subscription without paying for it to the operator. This can be avoided by using a one-time access key such as an One Time Password (OTP), which must be periodically verified by every user to renew his/her subscription to the multimedia services. During the access key verification process, the operator may transmit a periodic activation key, which will be used to encrypt the subscriber's entitlement data for a predetermined period of subscription. Therefore, the unauthorized users will not be able to complete the verification process for decrypting the entitlement data, if they do not have access to a mobile number registered for the verification process.

Further, even if an adversary tries to skip the access key verification process through modification of the access cards, the adversary will not be able to decrypt his entitlement messages due to lack of the periodic activation key required for decrypting the entitlement messages. Consequently, the adversary will not be able to access any unsubscribed multimedia service.

In an embodiment, the proposed method adds multiple levels of security for the information appliance devices and the corresponding access cards. So, even if the access card is cloned or duplicated, it cannot be used on any information appliance device other than the information appliance device used by the authorized user, and vice versa. In other words, the user's information appliance device, the corresponding access card, and the registered mobile number of the user are all tightly coupled to each other at the time of initial registration of the user, and therefore, unauthorized usage of subscription is not possible if the user does not have access to even a single entity out of the above three entities.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for preventing security breach in an information appliance device 103 in accordance with some embodiments of the present disclosure.

The environment 100 includes a user 101, an information appliance device 103, and a multimedia content server 107. The user 101 may be a subscriber of multimedia service provided by a multimedia service provider or an operator of the multimedia content server 107. The user 101 may access the multimedia service through the information appliance device 103 upon successful validation and subscription of the multimedia service from the multimedia content server 107.

In an embodiment, the information appliance device 103 may be a Set-Top Box (STB), a multimedia signal/broadcast signal receiver or any such device capable of communicating with the multimedia service provider and/or the multimedia content server 107 for receiving the multimedia contents subscribed by the user 101. For the purposes of embodiments disclosed in the present disclosure, the information appliance device 103 may comprise a unique access card (also referred as smartcard), which is configured with operator specific information to prevent security breach at the information appliance device 103. As an example, the operator specific information configured in the access card may include, without limitation, information such as, name of the operator or the multimedia service provider, a unique identifier of the operator, a unique use key associated with the operator, and the like.

In an embodiment, the multimedia content server 107 may receive a content access request 102 from the user 101, for accessing the multimedia service provided by the multimedia content server 107, through a network interface 105. In an implementation, the network interface 105 may include any existing wired and/or wireless communication interfaces, or suitable combinations thereof. The network interface 105 may be used to set-up a communication link between the information appliance device 103 and the multimedia content server 107 or between the user 101 and the multimedia content server 107.

In one embodiment, the content access request 102 may include one or more user credentials such as, a registered mobile number of the user 101, a registered electronic mail identifier (e-mail ID) of the user 101 and the like, along with the request for accessing the multimedia service from the multimedia content server 107. Consequently, upon receiving the content access request 102 from the user 101, the multimedia content server 107 may validate the content access request 102 by comparing the one or more user credentials prestored in the multimedia content server 107 with corresponding one or more user credentials included in the content access request 102.

Further, upon successful validation of the content access request 102, the multimedia content server 107 may generate a control message 108 which is specific to the information appliance device 103 and the user 101 who has made the content access request 102. As an example, the control message 108 may include, without limiting to, the first one-time access key, a periodic activation key and other control information required for providing the multimedia service to the user 101 through the information appliance device 103. In an embodiment, simultaneously to generating the control message 108, the multimedia content server 107 may also generate the second one-time access key 110. Further, the multimedia content server 107 may simultaneously transmit the control message 108 and the second one-time access key 110 to the to the information appliance device 103 and the user 101 respectively.

In some embodiments, the information appliance device 103 decrypts the control message 108 and retrieves the first one-time access key and the periodic activation key from the control message 108. Further, the information appliance device 103 may forward the first one-time access key to the access card and notify the user 101 to input the second one-time access key 110 to the information appliance device 103 through an end user device associated with the user 101. As an example, the user device (not shown in FIG. 1) may include, without limiting to, a Personal Digital Assistant (PDA) associated with the user 101, a mobile device, or a smartphone associated with the user 101, which is used to communicate with the information appliance device 103 and the multimedia content server 107.

In an embodiment, upon receiving the second one-time access key 110 from the user 101, the information appliance device 103 may forward the second one-time access key 110 to the access card, which in turn, may verify the second one-time access key 110 received from the user 101. In an embodiment, the access card may verify the second one-time access key 110 by comparing the second one-time access key 110 with the first one-time access key and determining a match between the second one-time access key 110 and the first one-time access key.

In an embodiment, upon successful verification of the second one-time access key 110, the access card may activate the periodic activation key retrieved from the control message 108. As an example, the periodic activation key may be an access activation/renewal key, which authorizes the user 101 to access the multimedia service for a predetermined period, say a period of 15 days or 30 days. Further, upon completion of the predetermined period, the periodic activation key may automatically expire or become invalid, revoking user's access to the multimedia service. Thereafter, the user 101 must make a fresh content access request 102 to the multimedia content server 107, to receive a new second one-time access key 110 and a fresh periodic activation key to renew access to the multimedia service. Hence, the information appliance device 103 ensures that the user 101 must undergo periodical verification process to continue access to the multimedia service. Also, the information appliance device 103 minimizes adverse effects of cloning and/or duplication of the access cards, since the user 101 must complete the access key verification process to activate the period activation key received from the multimedia content server 107.

Figure 2A:
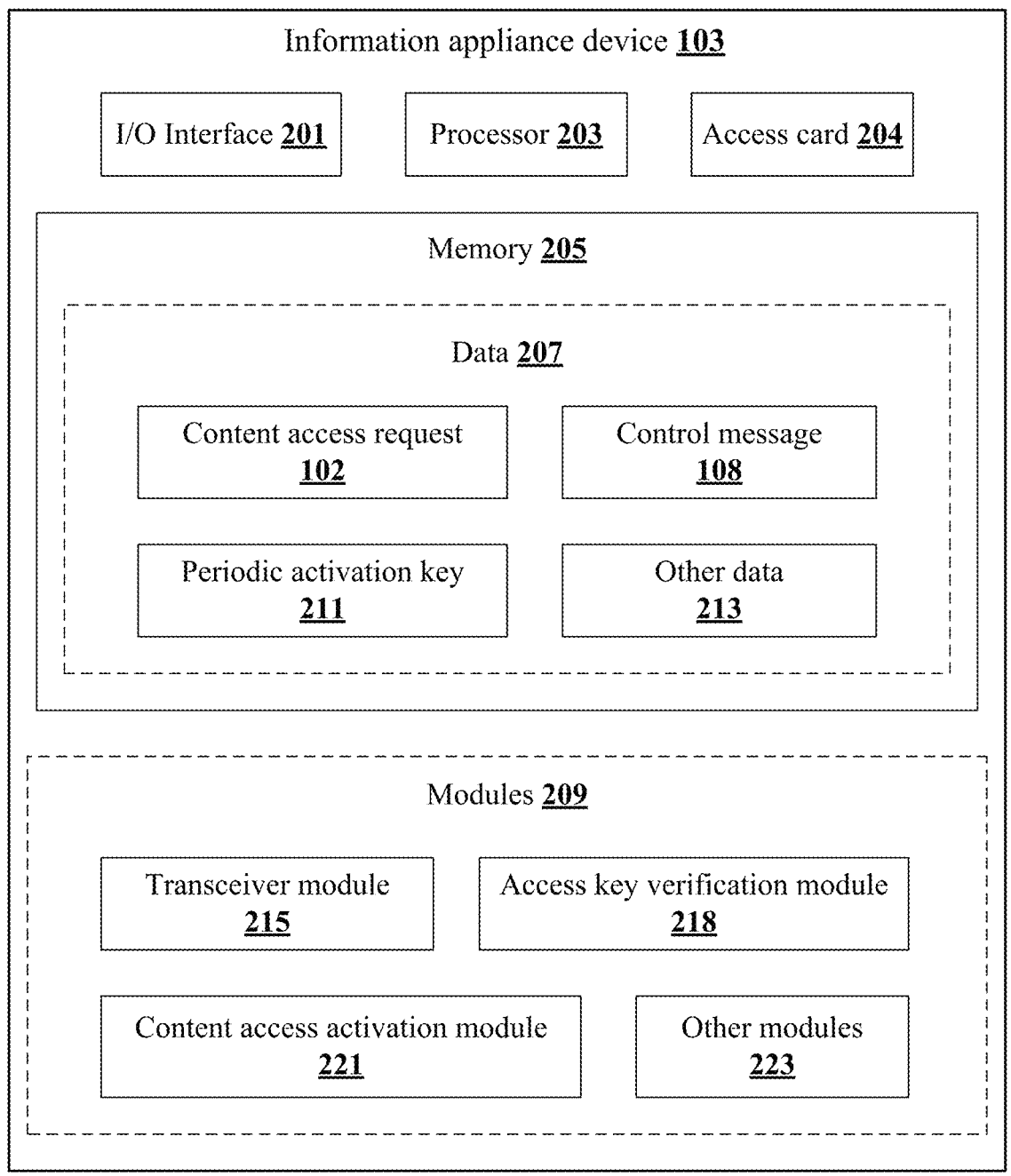
FIG. 2A shows a detailed block diagram illustrating an information appliance device in accordance with some embodiments of the present disclosure.

FIG. 2A shows a detailed block diagram illustrating an information appliance device 103 in accordance with some embodiments of the present disclosure.

The information appliance device 103 may include an I/O interface 201, a processor 203, an access card 204 and a memory 205. The I/O interface 201 may be configured to communicate with a multimedia content server 107 to receive a control message 108, in response to the content access request 102 made by the user 101. Further, the I/O interface 201 may be used to communicate with a user 101, through an end user device associated with the user 101, for receiving a second one-time access key 110 from the user 101. The memory 205 may be communicatively coupled to the processor 203. The processor 203 may be configured to perform one or more functions of the information appliance device 103 for preventing security breach in the information appliance device 103. The access card 204 may be uniquely configured with operator specific information and inserted in the information appliance device 103. As an example, the operator may be a multimedia service provider.

In some implementations, the information appliance device 103 may include data 207 and modules 209 for performing various operations in accordance with the embodiments of the present disclosure. In an embodiment, the data 207 may be stored within the memory 205 and may include, without limiting to, the content access request 102, the control message 108, a periodic activation key 211, and other data 213.

In some embodiments, the data 207 may be stored within the memory 205 in the form of various data structures. Additionally, the data 207 may be organized using data models, such as relational or hierarchical data models. The other data 213 may store data, including temporary data and temporary files, generated by the modules 209 while performing various functions of the information appliance device 103.

In an embodiment, the content access request 102 may be a request made by the user 101 for accessing the multimedia service, provided by a multimedia content server 107. The content access request 102 may also include the one or more user credentials, which are used by the multimedia content server 107 for validating the content access request 102. As an example, the content access request 102 may be made through an end user device associated with the user 101.

In an embodiment, the control message 108 may be generated by the multimedia content server 107 upon validating the content access request 102 received from the user 101. As an example, the control message 108 may include a first one-time access key, a periodic access key and other control information. The other control information may include information which are necessary for setting up a valid communication link between the information appliance device 103 and the multimedia content server 107 for broadcasting the multimedia service. In an implementation, the control message 108 may be encrypted with a public encryption key corresponding to the information appliance device 103 before transmitting the control message 108 to the information appliance device 103. Later, the information appliance device 103 may decrypt the control message 108 using the same public encryption key for retrieving the first one-time access key, the periodic activation key 211 and other control information from the control message 108.

In an embodiment, the periodic activation key 211 may be an access activation/renewal key, which authorizes the user 101 to access the multimedia service for a predetermined period, say a period of 15 days of 30 days as determined by the operator or the multimedia service provider. Further, upon completion of the predetermined period, the periodic activation key 211 may automatically expire or become invalid, resulting in cancellation of user's access to the multimedia service. Thus, the periodic activation key 211 acts as a vital information that regulates unauthorized users from accessing the multimedia service. In an embodiment, a grace period of 2-3 days may be given to the user 101 for re-activating the periodic activation key 211, thereby ensuring an uninterrupted multimedia service access to the user 101.

In an embodiment, the data 207 may be processed by one or more modules 209 of the information appliance device 103. In one implementation, the one or more modules 209 may be stored as a part of the processor 203. In another implementation, the one or more modules 209 may be communicatively coupled to the processor 203 for performing one or more functions of the information appliance device 103. The modules 209 may include, without limiting to, a transceiver module 215, an access key verification module 218, a content access activation module 221, and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the information appliance device 103. It will be appreciated that such modules 209 may be represented as a single module or a combination of different modules.

In an embodiment, the transceiver module 215 may be responsible for exchange of data and/or communication between the information appliance device 103 and the end user device and the multimedia content server 107. For instance, the transceiver module 215 may receive the control message 108 from the multimedia content server 107 in response to the content access request 102 made by the user 101. Subsequently, the transceiver module 215 may be responsible for receiving the second one-time access key 110 from the user 101, through the end user device associated with the user 101, and providing service activation details to the user 101 upon successful activation of the periodic activation key 211.

In an embodiment, the access key verification module 218 may be responsible for verifying the second one-time access key 110 received from the user 101. As an example, the access key verification module 218 may compare the second one-time access key 110 with the first one-time access key received from the multimedia content server 107 to determine a match between the second one-time access key 110 and the first one-time access key. The verification of the second one-time access key 110 may be considered successful when the second one-time access key 110 matches with the first one-time access key. In some implementation, the access key verification module 218 may be configured within the access card 204 inserted into the information appliance device 103.

In an embodiment, the content access activation module 221 may be responsible for activating the periodic activation key 211 and authorizing the user 101 to access the multimedia service upon successful verification of the second one-time access key 110 received from the user 101. Further, the content access activation module 221 may be configured to notify the user 101 about activation of the multimedia service requested by the user 101. Also, the content access activation module 221 may notify the user 101 about the predetermined period, after completion of which, the user 101 may renew his access to the multimedia service by making a fresh content access request 102 to the multimedia content server 107.

Figure 2B:
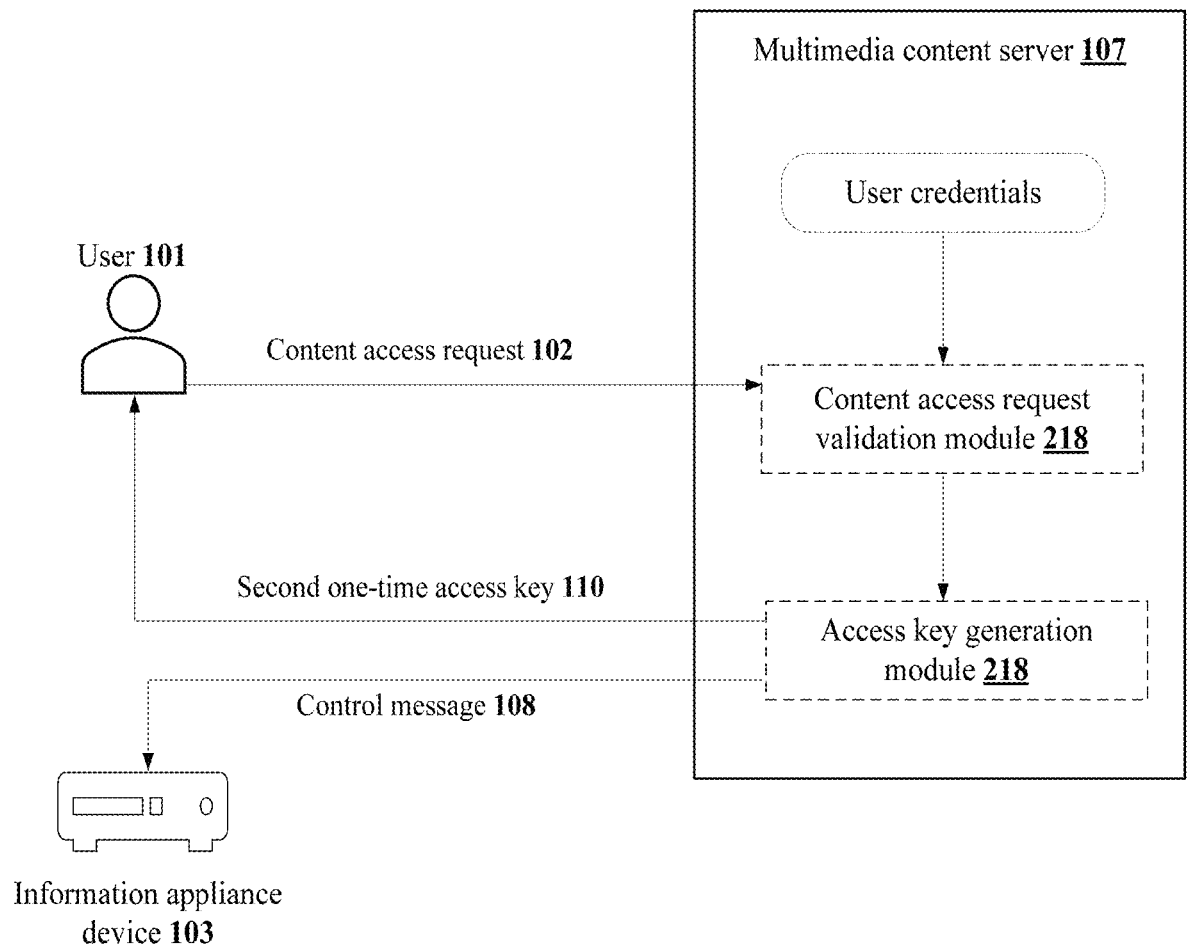
FIG. 2B shows a detailed block diagram illustrating a multimedia content server in accordance with some embodiments of the present disclosure.

FIG. 2B shows a detailed block diagram illustrating a multimedia content server 107 in accordance with some embodiments of the present disclosure.

In an implementation, the multimedia content server 107 may comprise a content access request validation module 233 and an access key generation module 235. Further, the multimedia content server 107 may also store one or more user credentials 231 [also referred as user credentials 231] related to the user 101. For example, the user credentials 231 may include, without limiting to, a registered mobile number of the user 101, a registered electronic mail identifier (e-mail ID) of the user 101 and the like, which helps in determining a unique identity of the user 101. In an embodiment, the one or more user credentials 231 may be received from the user 101, when the user 101 is requesting an access to the multimedia service for a first time. On subsequent requests made by the user 101, the multimedia content server 107 may refer to the already stored one or more user credentials 231 to identify the user 101. Further, the one or more user credentials 231 are periodically updated to reflect any changes in the credentials of the user 101.

In an embodiment, the content access request validation module 233 may be responsible for validating the content access request 102 made by the user 101. The content access request validation module 233 may validate the content access request 102 by comparing one or more user credentials 231 comprised in the content access request 102 with the corresponding one or more user credentials 231 pre-stored in the multimedia content server 107. In an embodiment, the content access request 102 may be validated as a first-level of user 101 authentication, as soon as the multimedia content server 107 receives the content access request 102 from the user 101. The content access request 102 may be validated to verify that the content access request 102 has originated from an authorized user 101 of the information appliance device 103.

In an embodiment, the access key generation module 235 may be responsible for generating the control message 108 and the second one-time access key 110 when the content access request 102 is determined to be valid. The control message 108 may include, without limiting to, the first one-time access key, the periodic activation key 211 and other control information. In an embodiment, the first one-time access key may be same as the second one-time access key 110, and both may be in the form of an One Time Password (OTP). Further, the access key generation module 235 may simultaneously transmit the control message 108 and the second one-time access key 110 to the information appliance device 103 and the user 101 respectively.

Thus, the multimedia content server 107 establishes a first level of security to the information appliance device 103 by validating the content access request 102 and thereby, eliminating chances of false access requests made to the information appliance device 103.

Figure 3A:
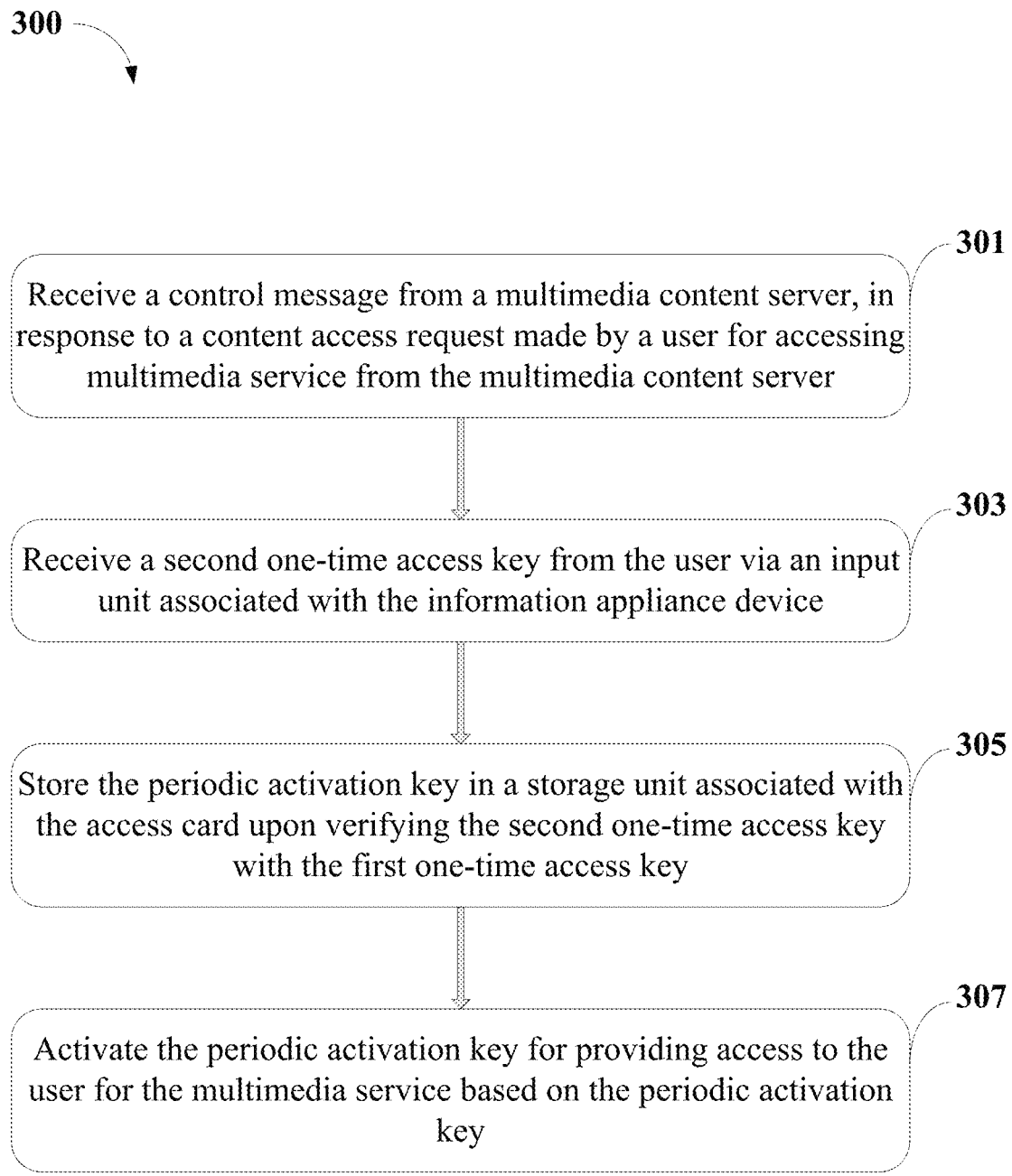
FIG. 3A shows a flowchart illustrating a method for preventing security breach in the information appliance device in accordance with some embodiments of the present disclosure.

FIG. 3A shows a flowchart illustrating a method for preventing security breach in an information appliance device 103 in accordance with some embodiments of the present disclosure.

As illustrated in FIG. 3A, the method 300 includes one or more blocks illustrating a method for preventing security breach in the information appliance device 103 using the information appliance device 103, for example the information appliance device 103 of FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 comprises receiving, by the information appliance device 103, a control message 108 from a multimedia content server 107. In an embodiment, the content access request 102 is a request made by the user 101 to the multimedia content server 107 for accessing multimedia service from the multimedia content server 107. The multimedia content server 107 may transmit the control message 108 to the information appliance device 103 only upon validating the content access request 102 made by a user 101. As an example, the control message 108 may include, without limiting to, a first one-time access key and a periodic activation key 211.

At block 303, the method 300 comprises receiving, by the information appliance device 103, a second one-time access key 110 from the user 101. In an embodiment, the second one-time access key 110 may be provided to the user 101, through an end user device associated with the user 101, by the multimedia content server 107 upon validating the content access request 102. As an example, the content access request 102 may be validated by comparing on one or more user credentials 231 stored in the multimedia content server 107 with the one or more user credentials 231 in the content access request 102. In an embodiment, the one or more user credentials 231 may include, without limiting to, a registered mobile number of the user 101, a registered electronic mail identifier (e-mail ID) of the user 101 and the like.

At block 305, the method 300 comprises verifying, by the information appliance device 103, the second one-time access key 110 with the first one-time access key for storing the periodic activation key 211 in a storage unit associated with the access card 204. In an embodiment, the periodic activation key 211 may be stored in the storage unit only upon verifying the second one-time access key 110. Further, upon activating the periodic activation key 211, the information appliance device 103 may generate and exchange a unique pairing Identifier (pairing ID) with the access card 204 for establishing connectivity between the information appliance device 103 and the access card 204.

At block 307, the method 300 comprises activating, by the information appliance device 103 the periodic activation key 211 for providing access to the user 101 for the multimedia service based on the periodic activation key 211. In an embodiment, the periodic activation key 211 may provide access to the user 101 for the multimedia service for a predetermined period. Further, the user 101 may have to make subsequent content access request 102 for accessing and/or renewing access to the multimedia service upon completion of the predetermined period.

Figure 3B:
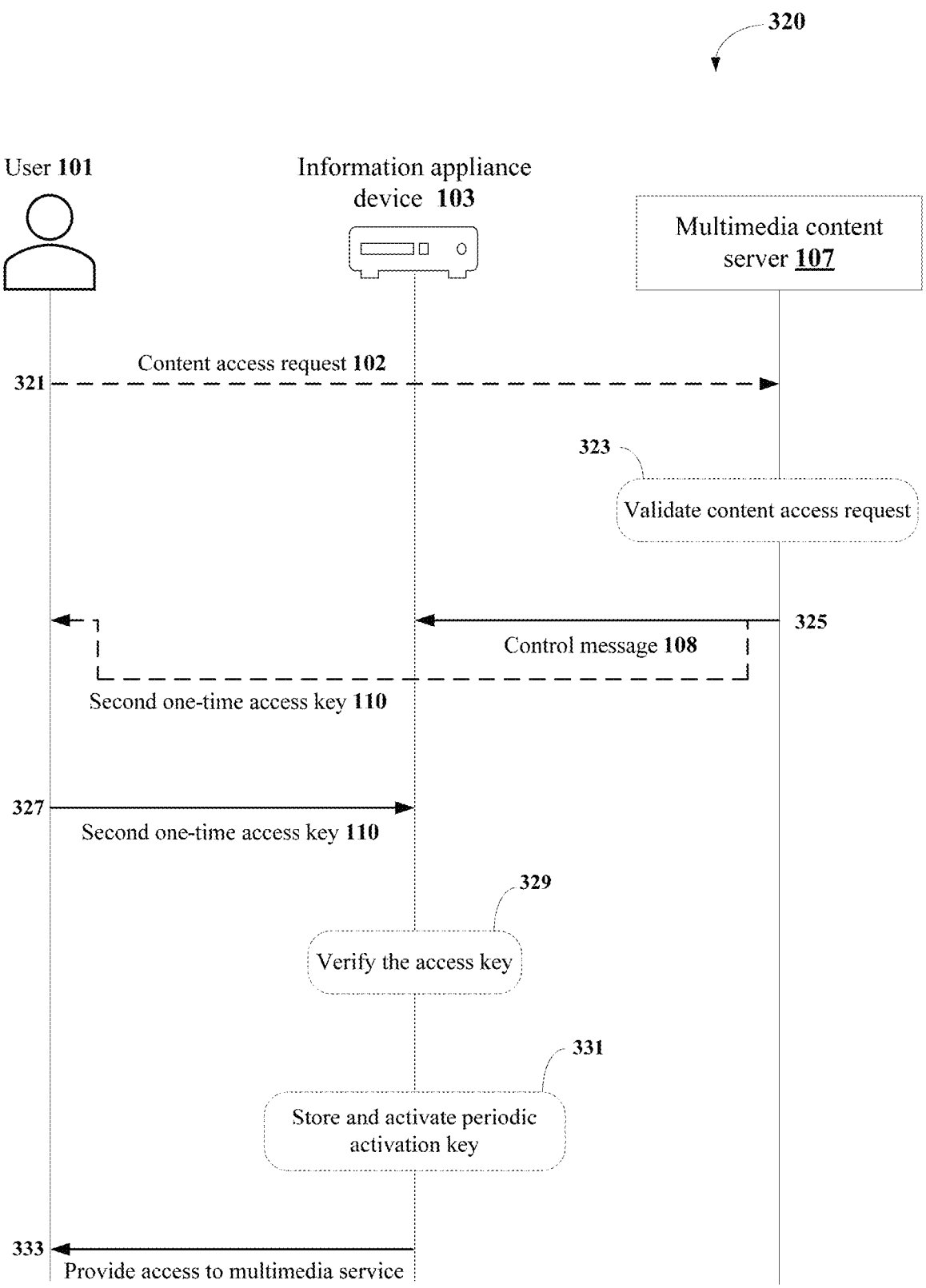
FIG. 3B shows a sequence diagram illustrating a method for preventing security breach in the information appliance device in accordance with some embodiments of the present disclosure.

FIG. 3B shows a sequence diagram 320 illustrating a method for preventing security breach in the information appliance device 103 in accordance with some embodiments of the present disclosure.

The sequence diagram 320 shows sequence of communication between the user 101, the information appliance device 103 and the multimedia content server 107 while providing access to the user 101 for the multimedia service of the multimedia content server 107 through the information appliance device 103.

At step 321, the user 101 may request the multimedia content server 107 for accessing the multimedia service from the multimedia content server 107. In an embodiment, the request made by the user 101 may be the content access request 102.

At step 323, the multimedia content server 107 may validate the content access request 102 by comparing one or more user credentials 231 comprised in the content access request with the one or more user credentials 231 prestored in the multimedia content server 107. In an embodiment, the multimedia content server 107 may transmit a void signal to the information appliance device 103 when validation of the content access request 102 is not successful. i.e., when the content access request 102 is invalid.

At step 325, the multimedia content server 107 may generate the control message 108 comprising the first one-time access key, the periodic activation key 211 and other control information upon successful validation of the content access request 102. Further, the multimedia content server 107 transmits the control message 108 to the information appliance device 103. Simultaneously, the multimedia content server 107 may also transmit a second one-time access key 110 to the user 101.

At step 327, the information appliance device 103 may receive the second one-time access key 110 from the user 101 for verifying the second one-time access key 110 of the user 101 and, thereby determining authenticity of the user 101. Here, the user 101 may input the second one-time access key 110 to the information appliance device 103, in response to a notification from the information appliance device 103, prompting the user 101 to input the second one-time access key 110.

At step 329, the information appliance device 103 may verify the second one-time access key 110 received from the user 101 by comparing the second one-time access key 110 with the first one-time access key retrieved from the control message 108. The second one-time access key 110 may be determined to be successfully verified when the second one-time access key 110 matches with first one-time access key. In an embodiment, the verification of the second one-time access key 110 may be performed by the access card 204 in the information appliance device 103.

At step 331, the information appliance device 103 may store the periodic activation key 211 in a storage unit associated with the access card 204, and activates the periodic activation key 211 upon successful verification of the second one-time access key 110. Here, activation of the periodic activation key 211 includes authorizing the content access request 102 for a predetermined period specified by the periodic activation key 211.

At step 333, the information appliance device 103 may provide access to the user 101 for the multimedia service requested by the user 101 in the content access request 102. Further, the information appliance device 103 may notify the user 101 about the predetermined period for which the access is provided.

In an embodiment, an operator, or a service provider associated with the multimedia content server 107 may have an option to deactivate the user's access to the multimedia services, if there is suspicion of a security breach by the user 101. Later, the user 101 may be asked to re-activate the periodic activation key 211 by making a fresh content access request 102, which requires possession of registered mobile number to complete the access key verification process.

Further, both the information appliance device 103 and the access card 204 may be configured to generate a new and random pairing identifier (pairing ID) for mutual verification and connectivity between the information appliance device 103 and the access card 204. Later, the information appliance device 103 and the access card 204 exchange the generated pairing IDs to establish a secure link between the information appliance device 103 and the access card 204. In an embodiment, the pairing IDs may be used by the information appliance device 103 and the corresponding access card 204 to identify each other whenever required, for example, when the information appliance device 103 is being powered on or when the access card 204 is being inserted into the information appliance device 103.

Hence, even if an authorized user 101 is using a cloned or duplicated access card 204, and is also successful in getting the one-time access key somehow, the obtained one-time access key may be useless since the user 101 must also have access to the information appliance device 103 being used for establishing the secure link, as specified above. Otherwise, to proceed further with link activation process, the unauthorized user must also clone the information appliance device 103, which is impractical, considering complexity of the information appliance device 103. Thus, the present disclosure is helpful in preventing security breaches in the information appliance device 103, and more particularly the present disclosure helps in preventing cloning attacks in the information appliance device 103.

Computer System

Figure 4:
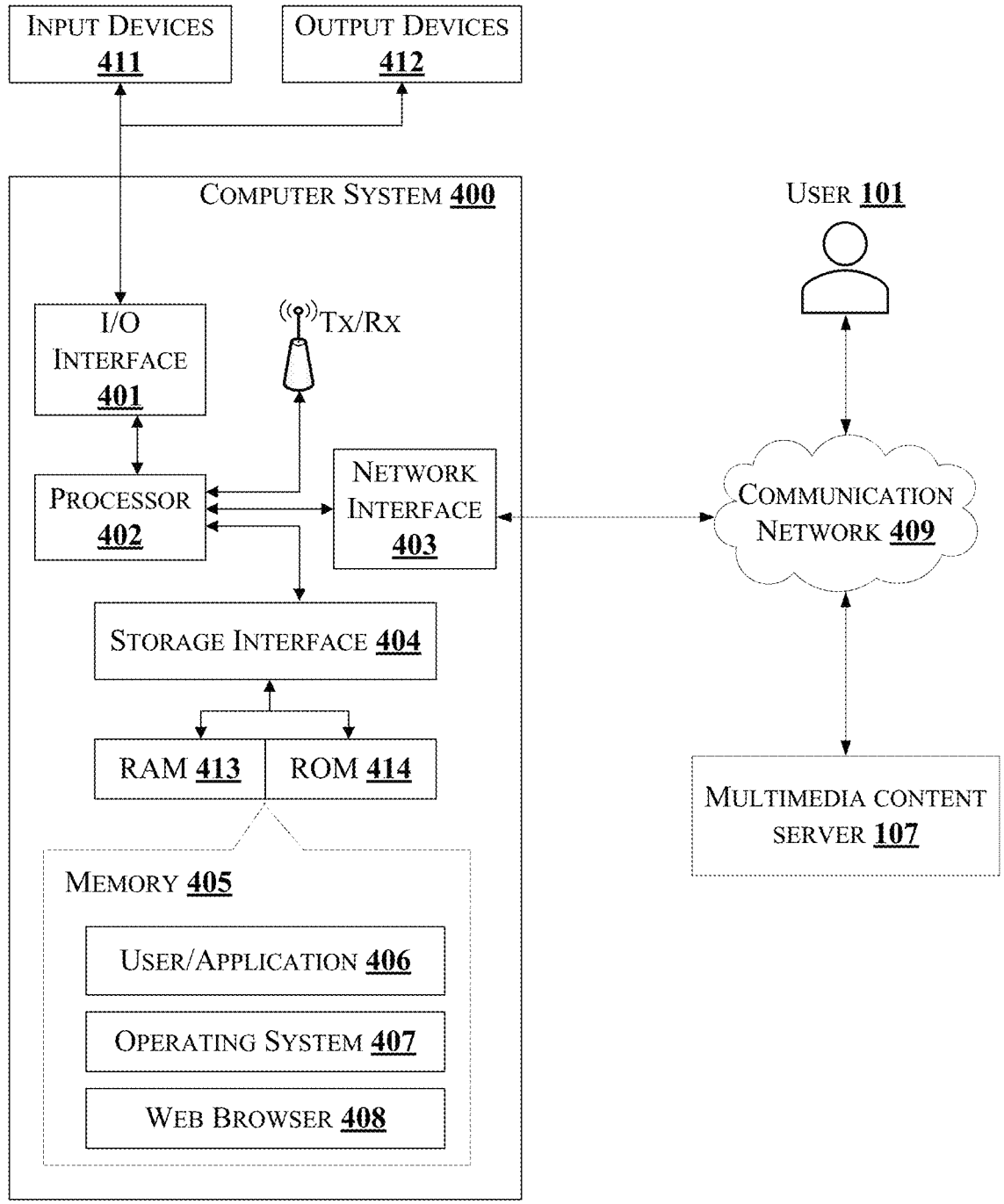
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be information appliance device 103 which comprises an unique access card 204 configured with operator specific information for preventing security breach in the information appliance device 103. The computer system 400 may include a central processing unit ("CPU" or "processor") 402. The processor 402 may comprise at least one data processor for executing program components for executing user- or system-generated business processes. A user 101 may include a person, a person using the information appliance device 103, an operator of the multimedia content server 107, a multimedia service provider and the like, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone associated with the user 101, through which the user 101 can make the content access request 102 to the multimedia content server 107, and input the second one-time access key 110 to the information appliance device 103.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 101 to communicate with a multimedia content server 107 to receive a control message 108 from the multimedia content server 107 subsequent to validation of the content access request 102 made by the user 101.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure discloses a method for preventing security breach in an information appliance device such as, a Set-Top Box (STB).

In an embodiment, the method of present disclosure mitigates unauthorized use of multimedia services from the information appliance device due to cloning or duplication of access card (smartcard) in the information appliance device.

In an embodiment, the method of present disclosure periodically verifies authenticity of a user of the information appliance device and prompts re-activation of the multimedia services, thereby continuously monitoring the multimedia service link to prevent any security breach.

In an embodiment, the method of present disclosure establishes an interoperability among the user's information appliance device, the corresponding access card, and user's registered credentials, and thereby prevents unauthorized access to the multimedia service when an unauthorized user does not have access to at least one of the above entities.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Environment |
| 101 | User |
| 102 | Content access request |
| 103 | Information appliance device |
| 105 | Network interface |
| 107 | Multimedia content server |
| 108 | Control message |
| 110 | Second one-time access key |
| 201 | I/O interface |
| 203 | Processor |
| 204 | Access card |
| 205 | Memory |
| 207 | Data |
| 209 | Modules |
| 211 | Periodic activation key |
| 213 | Other data |
| 215 | Transceiver module |
| 218 | Access key verification module |
| 221 | Content access activation module |
| 223 | Other modules |
| 231 | User credentials |
| 233 | Content access request validation module |
| 235 | Access key generation module |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

We claim:

1. A method for preventing security breach in an information appliance device comprising a unique access card configured with operator specific information, the method comprising:
receiving, by the information appliance device, a control message, comprising a first one-time access key and a periodic activation key, in response to a content access request made by a user for accessing multimedia service from a multimedia content server, from the multimedia content server upon validating the content access request by the multimedia content server, wherein the control message corresponds to the information appliance device;
receiving, by the information appliance device, a second one-time access key from the user, wherein the second one-time access key is provided to the user, through an end user device associated with the user, directly from the multimedia content server upon validating the content access request, and the second one-time access key is entered on the end user device by the user, wherein the end user device is used by the user to communicate with the information appliance device and the multimedia content server;
verifying, by the information appliance device, the second one-time access key with the first one-time access key for storing the periodic activation key in a storage unit associated with the access card upon verification of the second one-time access key by determining whether the second one-time access key matches the first one-time access key; and
in response to determining that the second one-time access key matches the first one-time access key, activating, by the information appliance device, the periodic activation key for providing access to the user for the multimedia service based on the periodic activation key.

2. The method as claimed in claim 1, wherein the content access request is validated based on one or more user credentials stored in the multimedia content server.

3. The method as claimed in claim 1, wherein the periodic activation key provides access to the user for the multimedia service for a predetermined period.

4. The method as claimed in claim 3, wherein the user makes subsequent content access request for accessing the multimedia service upon completion of the predetermined period.

5. The method as claimed in claim 1 further comprising: exchanging a pairing identifier between the information appliance device and the access card for pairing the information appliance device and the access card subsequent to verification of the second one-time access key.

6. An information appliance device, comprising a unique access card configured with operator specific information, for preventing security breach in the information appliance device, the information appliance device comprises:
a processor; and
a memory, communicatively interfaced with the processor, wherein the memory stores processor-executable instructions, which on execution cause the processor to:
receive a control message, comprising a first one-time access key and a periodic activation key, in response to a content access request made by a user for accessing multimedia service from a multimedia content server, from the multimedia content server upon validating the content access request by the multimedia content server, wherein the control message corresponds to the information appliance device;
receive a second one-time access key from the user, wherein the second one-time access key is provided to the user, through an end user device associated with the user, directly from the multimedia content server upon validating the content access request, and the second one-time access key is entered on the end user device by the user, wherein the end user device is used by the user to communicate with the information appliance device and the multimedia content server;
verify the second one-time access key with the first one-time access key to store the periodic activation key in a storage unit associated with the access card upon verification of the second one-time access key by determining whether the second one-time access key matches the first one-time access key; and
in response to determining that the second one-time access key matches the first one-time access key, activate the periodic activation key to provide access to the user for the multimedia service based on the periodic activation key.

7. The information appliance device as claimed in claim 6, wherein the instructions further cause the processor to validate the content access request based on one or more user credentials stored in the multimedia content server.

8. The information appliance device as claimed in claim 6, wherein the periodic activation key provides access to the user for the multimedia service for a predetermined period.

9. The information appliance device as claimed in claim 8, wherein the user makes subsequent content access request to access the multimedia service upon completion of the predetermined period.

10. The information appliance device as claimed in claim 6, wherein the instructions further cause the processor to exchange a pairing identifier between the information appliance device and the access card to pair the information appliance device and the access card subsequent to verification of the second one-time access key.

* * * * *